United States Patent Office 3,438,082
Patented Apr. 15, 1969

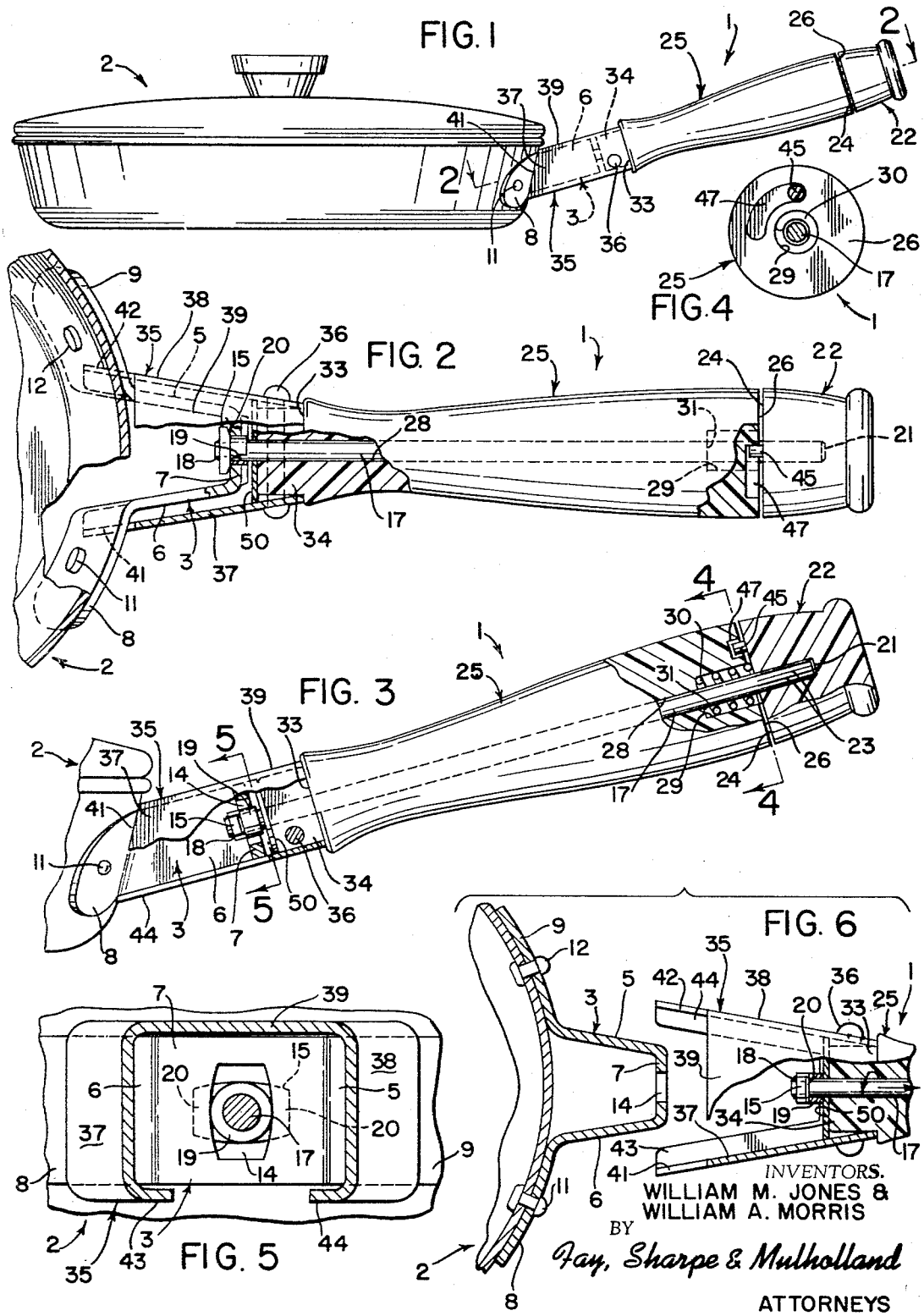

3,438,082
DETACHABLE HANDLE
William M. Jones, Big Flats, and William A. Morris, Elmira, N.Y., assignors to The Youngstown Steel Door Company, Cleveland, Ohio, a corporation of Ohio
Filed June 23, 1966, Ser. No. 559,816
Int. Cl. A47j 45/07, 45/10
U.S. Cl. 16—114        4 Claims

ABSTRACT OF THE DISCLOSURE

A detachable handle for cooking vessels having a handle receiving projection which includes a metal shaft having a noncylindrical lug on the end thereof to extend through and behind a noncylindrical opening in the end of the projection to lock the handle in close projection-encircling relation with the cooking vessel. The handle includes a knob on the end of the shaft opposite the lug, an elongated nonmetal hand grip portion surrounding the shaft, and a housing rigidly mounted on the hand grip portion which acts as the encircling portion in engagement with the projection. Rotation of the knob after the housing has been placed in encircling relation with the projection acts to cam the handle into tight engagement with the vessel. A spring is provided to bias the shaft, lug, and knob assembly in a direction away from the cooking vessel against the inside wall of the projection when it is in the locked position.

---

This invention relates to detachable handles for cooking ware vessels.

It has been recognized in the marketing of cooking ware that there are commercial and practical advantages to providing one handle for several sizes of pans or cooking vessels. The concept of the detachable handle cooking ware permits a variety of sizes of pans to be provided at lower cost and greater convenience to the consumer.

An important aspect of the consumer convenience is the simplification of storage permitted by the detachable handles in that the bodies of the dishes or pans may be nested together and the single handle stored elsewhere without taking up a large amount of cupboard or shelf space.

Detachable handles provide other advantages to the consumer in that when they are used on cooking ware for use in ovens, it is not necessary to place them in the oven with the dish. Oven heat has a tendency to deteriorate most thermal insulating materials and also has the immediate effect of making the handle too hot to grip manually without auxiliary thermal insulating means such as a hot pad. The use of a detachable handle permits the handle to remain out of the oven so that it is cool enough to manipulate for taking heated casseroles or other dishes from the oven.

There is still another advantage in using elongated detachable handles particularly in the larger cooking ware such as casseroles in that they can convert these dishes which normally require two hands to carry when full, for single hand manipulation so that the other hand is free for flame control, stirring or serving directly from the vessel.

The improved detachable handle for cooking vessels of the instant invention is designed for cooking vessels having a projecting ear with a hollow or open central area with an aperture in the outermost end thereof which is noncylindrical. The ear is either attached by riveting or welding to the periphery of the vessel or may be a formed integral portion thereof.

A detachable handle constructed according to the principles of the invention has a cylindrical metal shaft and a noncylindrical lug which is rigidly disposed on one end of the shaft extending radially of the axis of the shaft. The noncylindrical lug is of shape and dimension complementary to that of the ear opening on the vessel such that it can be passed through the opening and turned about the axis of the shaft to lock behind it. The lug has a camming surface on the side engaging the projecting ear which cams it into place gradually until it firmly locks the handle to the vessel. The handle has a nonmetal knob rigidly attached to the opposite end of the shaft which has a periphery which is radially further from the axis of the shaft than the end of the lug. This arrangement provides for a mechanical advantage to simplify the locking procedure.

A thermally insulated hand grip portion lies between the knob and the lug and surrounds the shaft. A spring is mounted therein to bias the lug in the direction of the hand grip. A noncylindrical housing means is rigidly attached to the hand grip portion and surrounds the lug and extends outwardly therefrom such that it may be telescopically received on the projecting ear of the vessel in close fitting engagement for rigid attachment. Rotational movement of the lug in response to rotation of the knob cams the lug into and out of locking engagement behind the portion of the ear having the opening. The knob and hand grip portion are provided with suitable means to limit the rotation to the amount needed for the locking and unlocking operation.

The particular detachable handle of this invention is designed to greatly simplify the manufacturing process and to eliminate the multitude of complicated forming operations which have heretofore been required in the production of detachable handles. This extremely simple handle will thus permit a more practical consumer item which, because of its inexpensive cost of manufacture, will be priced more reasonably for reaching a broader segment of the consumer market than the heretofore known handles have been capable of reaching.

Accordingly, it is an object of this invention to provide a novel detachable handle which requires fewer manufacturing operations.

It is a further object of the invention to provide a novel detachable handle which does not require a multitude of expensive and complex metal bending dies for production during manufacture but which has all of the functions and advantages of the more complex and more expensive detachable handles of the prior art.

It is a further object of the invention to provide a detachable handle which has a positive mechanical action with fewer moving parts than the handles of the prior art, therefore, lessening the danger of accidents to the consumer from failure of a handle to hold a vessel full of hot food.

Other objects of the invention will become apparent from the following detailed description of the invention.

In the drawings:

FIG. 1 illustrates a side elevational view of a detachable handle made according to the principles of the instant invention attached to a cooking vessel having a projecting ear therefor.

FIG. 2 is a fragmentary view of the handle and vessel of FIG. 1 with portions broken away for clarity, taken along the line 2—2 of FIG. 1.

FIG. 3 is an enlarged side elevational view with certain of the parts shown in cross section for clarity.

FIG. 4 is a view along the line 4—4 of FIG. 3.

FIG. 5 is a view along the line 5—5 of FIG. 3.

FIG. 6 is a view similar to FIG. 2 showing the handle and vessel in disassembled condition.

In the illustrated embodiment of the drawings, the numeral 1 generally designates the novel detachable handle of the invention. The numeral 2 generally designates the cooking vessel to which it is attached.

Vessel 2 has a projecting ear 3 having sidewalls 5 and 6 and an interconnecting outermost base wall 7. The sidewalls 5 and 6 have outturned end portions 8 and 9 which have a curved contour for face-to-face engagement with the outer periphery of the vessel 2. The projecting ear 3 is suitably attached to the vessel 2 by means of rivets 11 and 12 extending through the extensions 8 and 9. It will be recognized that the ear 3 could be attached as by welding to the vessel 2 or could be formed integrally therein by suitable metal forming dies.

The sidewalls 5 and 6 of the ear 3 converge toward one another such that the end wall 7 is shorter than the distance between the extension portions 8 and 9. Within the end wall 7 is a noncylindrical opening 14, which for purposes of illustration is shown to be of generally rectangular shape with its longest sides flaring outwardly intermediate of their ends. Any noncylindrical shape may be utilized for the opening 14 so long as the shape of the lug 15 of the detachable handle which fits within it corresponds. The lug 15 is mounted rigidly upon a shaft 17 at the end thereof as by means of a weld 18 and adjacent thereto is a spacer collar 19 in the form of an annular member surrounding a portion of the shaft 17. The lug 15, as has been stated, is of the shape and dimension to be complementary to, and fit within, the noncylindrical opening 14. A camming surface 20 on the side of the lug 15 which engages wall 7 is contoured gradually to taper away from opposite end 21 of the shaft 17.

A nonmetal knob 22 is rigidly attached to the shaft end 21 by means of an appropriate force fit and is prevented from relative rotation therewith by grooves or other appropriate means 23 adjacent the end 21 of the shaft. The knob 22 has a generally flat annular surface 24 which extends for a radial distance from the axis of the shaft 17 beyond the radial distance the lug 15 extends to provide a mechanical advantage during the locking and unlocking operations.

An elongated nonmetal and thermally insulating hand grip portion 25 surrounds shaft 17 and has a face 26 substantially in face-to-face engagement with the surface 24 of the knob 22. The hand grip portion 22 has a central cavity or opening 28 which extends from one end thereof to the other such that the shaft 17 extends therethrough with the lug 15 projecting beyond the end of the hand grip portion 25. Cavity 28 has an enlarged portion 29 to receive a coil spring 30 which surrounds the shaft and acts against a shoulder 31 in the opening and the face 24 of the knob 22 to bias the knob and the hand grip portion in a direction away from each other.

On the end of the hand grip member 25 opposite the knob 22 is a noncylindrical extension portion 34 of reduced peripheral dimension from that of the hand grip portion 25. The opening 28, extends through the portion 34. Portion 34 is separated from the major portion of the hand grip portion 25 by means of a shoulder 33. A noncylindrical housing means 35 preferably of sheet metal is wrapped around the extension portion 34 in a rigid tight fitting engagement therewith and is held in place by a double headed pin 36 which extends from one side to the other of the housing 34 through the handle grip extension portion 34 upon which it is mounted. Portion 34 is also separated from spacer 19 by washer 50, which is so shaped that it touches both shaft 17 and the sidewalls of housing 35, thus supporting shaft 17 and preventing lateral motion of shaft 17 relative to the walls of housing 35.

Housing 35 is made up of two outwardly diverging sidewalls 37 and 38 and a connecting integral top wall 39 which are suitably contoured over the projecting ear 3 of the pan to permit the lug 15 to pass through the opening 14 and behind the outermost inner wall 7 when housing 35 is telescoped over the ear 3. The legs 37 and 38 are tapered at their outermost ends as at 41 and 42 to engage the sidewall of the vessel 2 and extend downwardly and around the lower edge of the projecting ear 3 by means of flanges 43 and 44 to insure that the ear 3 is fully surrounded in tight fitting relation to prevent the handle 1 from wobbling with respect to the vessel 2.

Thus, it will be seen that during the operation when the knob 22 is turned to lock the lug 15 behind the wall 7 of ear 3, the surfaces 41 and 42 engage the vessel side and the camming surface 20 of the lug 15 engages the inside of the ear 3 to provide a positive holding action therebetween.

Rotation of the knob 22 and the cam lug 15 and shaft 17 rigidly attached thereto into and out of locking position is limited by means of a pin 45 sliding within an arcuate groove 47, the pin 45 being attached rigidly to the knob 22 and the groove 47 being in the face 26 at the rear of the hand grip portion.

The pin 45 has a length related to the depth of the groove 47 such that the axial movement against the biasing force of the spring 30 which is governed by the axial dimension of the spacer 19 can be accomplished.

Accordingly, it will be seen that by the principles of this invention an inexpensive and easily operated detachable handle having virtually all of the advantages of the prior art devices but not having the disadvantage of the expensive and complex mechanical metal forming and assembly operations is accomplished.

For ease of description, the principles of the invention have been set forth in connection with but a single illustrated embodiment showing a detachable handle. It is not our intention that the illustrated embodiment nor the terminology employed in describing it to be limiting inasmuch as variations in these may be made without departing from the spirit of the invention. Rather, we desire to be restricted only by the scope of the appended claims.

I claim:

1. A detachable handle for cooking vessels having a handle receiving projection comprising:
   a metal shaft,
   a noncylindrical lug rigidly disposed on one end of said shaft and extending radially of the axis of said shaft,
   said lug having a camming surface on the side thereof closest to the end of said shaft opposite said one end,
   said camming surface being contoured gradually to taper away from the end of said shaft opposite said one end at the portions thereof most remote from the axis of said shaft,
   a nonmetal knob rigidly and nonrotatably attached to the end of said shaft opposite said one end,
   said knob having a generally flat surface on the side thereof closest to said lug extending radially of the axis of said shaft for a distance greater than the distance said lug extends radially,
   an elongated nonmetal hand grip portion having a generally flat surface substantially in face-to-face engagement with the generally flat surface portion of said knob,
   said hand grip portion having a central elongated opening extending from one end thereof to the other with said shaft extending therethrough and said lug disposed beyond the end of said hand grip portion opposite said knob,
   an enlarged portion of said elongated opening at the end thereof adjacent said knob,
   a coil spring mounted in said enlarged portion between said generally flat surface on said knob and the bottom of said enlarged portion for biasing said knob and said hand grip portion away from each other,
   and noncylindrical housing means rigidly and nonrotatably attached to said hand grip portion adjacent the end opposite said knob and extending therefrom outwardly beyond said lug in spaced relation to said lug on opposite sides thereof for close fitting nonrotational engagement with the outer periphery of a noncylindrical projection on a cooking vessel having an opening for receiving said lug therethrough for cammed movement therebehind into and out of locking engagement therewith in response to rotation of said knob.

2. The detachable handle of claim 1 in which spacer means engage and separate said lug from the end of said hand grip portion opposite said knob when said handle is detached from a cooking vessel but which is spaced from the end of said hand grip portion when said handle is attached to a cooking vessel.

3. The detachable handle of claim 1 in which one of said generally flat surfaces has a projection extending into a recess in the other of said flat surfaces for limiting rotation of said knob and lug relative to said hand grip portion.

4. The detachable handle of claim 1 in which the housing means forms an enclosure having a pair of side walls which converge toward each other in the direction of the ends thereof rigidly attached to said hand grip portion and which engage the cooking vessel at the ends opposite thereto.

References Cited

UNITED STATES PATENTS

| | | |
|---|---|---|
| 1,306,100 | 6/1919 | Chadwick. |
| 3,065,017 | 11/1962 | Serio. |
| 3,203,029 | 8/1965 | Serio _____ 16—114 |

BOBBY R. GAY, *Primary Examiner.*

DORIS L. TROUTMAN, *Assistant Examiner.*

U.S. Cl. X.R.

294—31

Dedication

3,438,082.—*William M. Jones*, Big Flats, and *William A. Morris*, Elmira, N.Y. DETACHABLE HANDLE. Patent dated Apr. 15. 1969. Dedication filed Sept. 28, 1970, by the assignee, *Youngstown Steel Door Company*. Hereby dedicates the entire term of said patent to the Public.
[*Official Gazette January 19, 1971*]